United States Patent [19]

Pomié et al.

[11] 4,342,721

[45] Aug. 3, 1982

[54] FAST NUCLEAR REACTOR

[75] Inventors: Pierre Pomié, Aix en Provence; Philippe Verrière, Manosque, both of France

[73] Assignee: Commissariat a l'Energie Atomique, Paris, France

[21] Appl. No.: 16,742

[22] Filed: Mar. 2, 1979

[30] Foreign Application Priority Data

Mar. 7, 1978 [FR] France .............................. 78 06435

[51] Int. Cl.³ ............................................ G21C 15/18
[52] U.S. Cl. .................................... 376/298; 376/405; 165/74; 165/78
[58] Field of Search ....................... 176/40, 38, 65, 87; 165/74, 78, 145

[56] References Cited

U.S. PATENT DOCUMENTS

| | | | |
|---|---|---|---|
| 3,242,981 | 3/1966 | Hutchinson et al. | 176/65 |
| 3,305,002 | 2/1967 | Leonard, Jr. et al. | 176/65 |
| 3,373,802 | 3/1968 | Wikund et al. | 165/74 |
| 3,537,420 | 11/1970 | Chollet et al. | 165/78 |
| 3,547,187 | 10/1970 | Cook et al. | 165/145 |
| 4,045,286 | 8/1977 | Blum et al. | 176/65 |
| 4,101,377 | 7/1978 | Berniolles et al. | 176/40 |
| 4,115,192 | 9/1978 | Joganol | 176/65 |
| 4,124,064 | 11/1978 | Jabsen et al. | 165/145 |

FOREIGN PATENT DOCUMENTS

| | | | |
|---|---|---|---|
| 2346868 | 8/1973 | Fed. Rep. of Germany . | |
| 89891 | 7/1967 | France | 176/65 |
| 1504486 | 10/1967 | France | 176/65 |
| 964841 | 7/1964 | United Kingdom | 176/65 |
| 1421826 | 1/1976 | United Kingdom | 176/65 |

OTHER PUBLICATIONS

Kerntechnik, vol. 15, 1973, No. 2, pp. 75-79.

Primary Examiner—Harvey E. Berrend

[57] ABSTRACT

A sodium-cooled fast reactor comprises at least one auxiliary heat exchanger constituted by a plurality of vertical heat-exchange modules each provided with a coolant circuit. A vertical cylindrical passage for each auxiliary heat exchanger extends through the reactor vault roof. The passage diameter is larger than the diameter of a heat-exchange module but smaller than the overall dimension of the auxiliary heat exchanger in horizontal cross-section. Each passage is closed by a shield plug after the modules have been placed in position, the modules being disposed around an axial extension of each shield plug.

10 Claims, 8 Drawing Figures

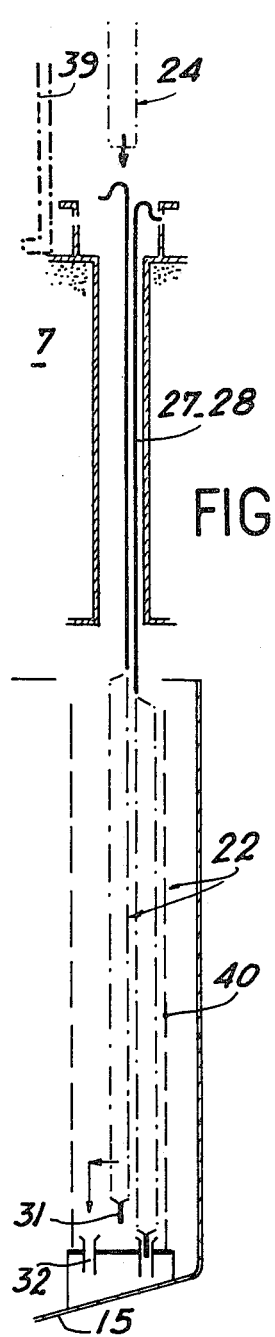
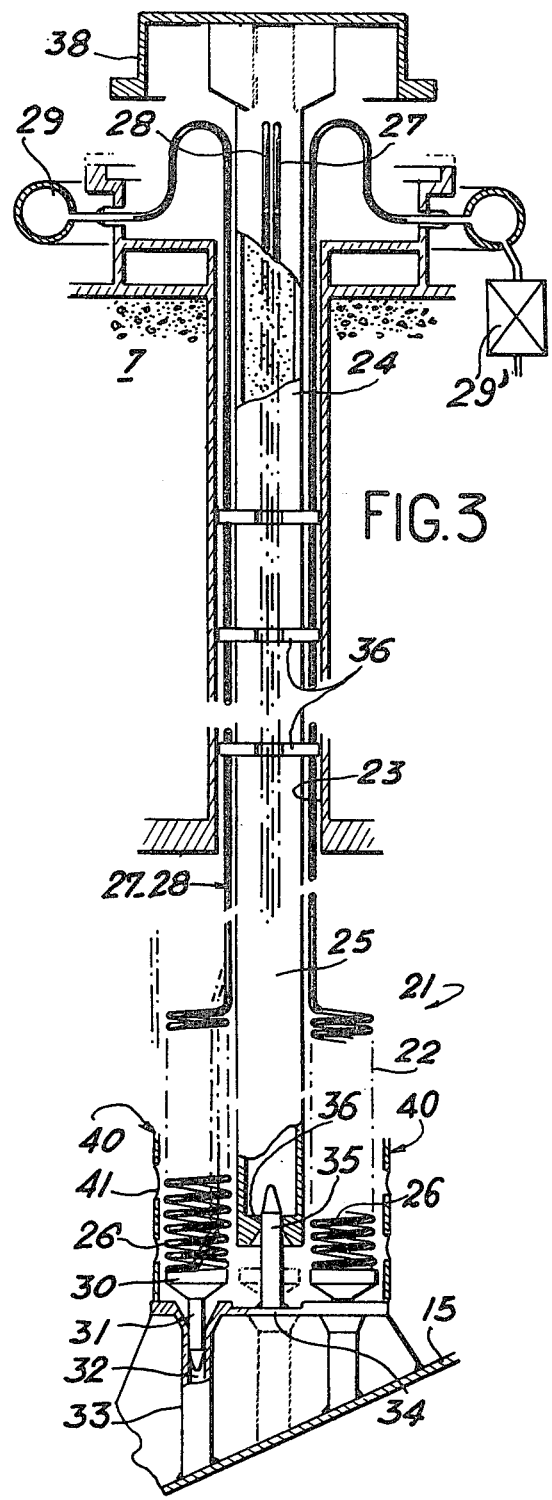

FAST NUCLEAR REACTOR

This invention relates to a fast nuclear reactor comprising at least one auxiliary heat exchanger which serves in particular to cool the liquid metal (such as sodium, for example) in the event of any operational incident resulting in stoppage of the primary pumps.

It is known that, in a fast reactor and especially in the so-called "integrated" design, the reactor core is immersed beneath the level of a predetermined volume of liquid metal contained within a vessel having a vertical axis. Said vessel is suspended from a horizontal concrete slab of substantial thickness or reactor vault roof which is traversed by primary pump bodies and intermediate heat-exchanger shells. During reactor operation, the liquid sodium is circulated continuously and cooled by means of said primary pumps and intermediate heat exchangers, thus extracting the heat picked up by the sodium as it passes through the reactor core and as a result of nuclear fission.

If an accident occurs within the reactor for any reason and in turn causes stoppage of the primary pumps, the fission reaction within the reactor core is immediately stopped as a result of the safety rod drop. It is readily apparent under such conditions that there still remains within the reactor core a high residual thermal output which must be removed in a reliable and efficient manner in order to prevent local core meltdown.

The present invention relates to a reactor equipped with an auxiliary heat exchanger which conforms in particular to these requirements.

It is also known that, as a general rule, the central portion of the reactor vault roof is occupied by a system of rotary shield plugs, with the result that the "stationary" portion of the vault roof is in fact limited to an annular ring. Moreover, in the case of integrated reactors, this ring is already largely occupied in particular by the primary pumps and by the main intermediate heat exchangers, namely the intermediate exchangers which normally serve to remove the power delivered by the reactor. As can therefore be understood, it is particularly advantageous to design auxiliary heat exchangers which take up only a small space in the reactor vault roof (roof penetration) in respect of a given thermal output.

To this end, the fast reactor under consideration is of the type comprising a vessel having a vertical axis and containing the reactor core, a volume of liquid metal for cooling the core and at least one main heat exchanger, said reactor vessel being closed at the top by a reactor vault roof. In addition, the reactor essentially comprises at least one auxiliary heat exchanger constituted by a plurality of vertical heat-exchange modules each provided with a circuit for the flow of coolant fluid. Said reactor vault roof is pierced by a vertical cylindrical orifice for each auxiliary heat exchanger, the dimension of each orifice in horizontal cross-section being larger than that of a heat-exchange module but smaller than the overall dimension of the auxiliary heat exchanger in horizontal cross-section. Provision is made for shield plugs which are adapted to close said orifice or orifices after said modules have been placed in position, said modules being disposed around an axial extension of each shield plug.

In a first embodiment, the fluid circuit of each module is constituted by a heat-transfer tube connected at the ends thereof respectively to an inlet tube and to an outlet tube for admission and discharge of the coolant fluid, the inlet and outlet tubes being adapted to extend in a direction parallel to the axis of the shield plug within a groove formed within this latter along one of its vertical generator-lines.

In a second embodiment, the circuit of each module is constituted by a plurality of U-tubes connected to an inlet header and an outlet header, said headers being associated respectively with an inlet tube and with an outlet tube for admission and discharge of the coolant fluid, said inlet and outlet tubes being adapted to extend parallel to the axis of the shield plug within a groove formed in this latter along one of its vertical generator-lines.

In a third embodiment, the fluid circuit of each heat-exchange module is constituted by a plurality of straight tubes connected at the ends thereof to an inlet header and to an outlet header, said headers being in turn connected respectively to an inlet tube and to an outlet tube for admission and discharge of the coolant fluid, the inlet and outlet tubes being adapted to extend in a direction parallel to the axis of said shield plug within a groove formed in this latter along one of its vertical generator-lines.

Finally and in accordance with another distinctive feature, each module is provided at the lower end with a centering pin adapted to engage in a bore formed in a support structure which is mounted within the reactor vessel and rigidly fixed to this latter.

By virtue of these arrangements, each auxiliary heat-exchanger module can be separately disassembled; after mounting within the reactor vessel, all these modules are spaced at intervals on a circle having a diameter which is larger than that of the vertical passage provided in the reactor vault roof for the introduction of each module in succession.

Further characteristic features of an auxiliary heat exchanger as constructed in accordance with the invention will become apparent from the following description of exemplified embodiments which are given by way of indication and not in any limiting sense, reference being made to the accompanying drawings, wherein:

FIG. 3 is a vertical sectional view to a larger scale and illustrating the constructional detail of one of the auxiliary heat exchangers of the reactor of FIG. 1;

FIGS. 4 and 5 are views to two different scales, respectively in transverse section to a large scale and in elevation to a smaller scale, which show in detail how the modules of each auxiliary heat exchanger are introduced into or withdrawn from the interior of the reactor vessel;

Figure 1:
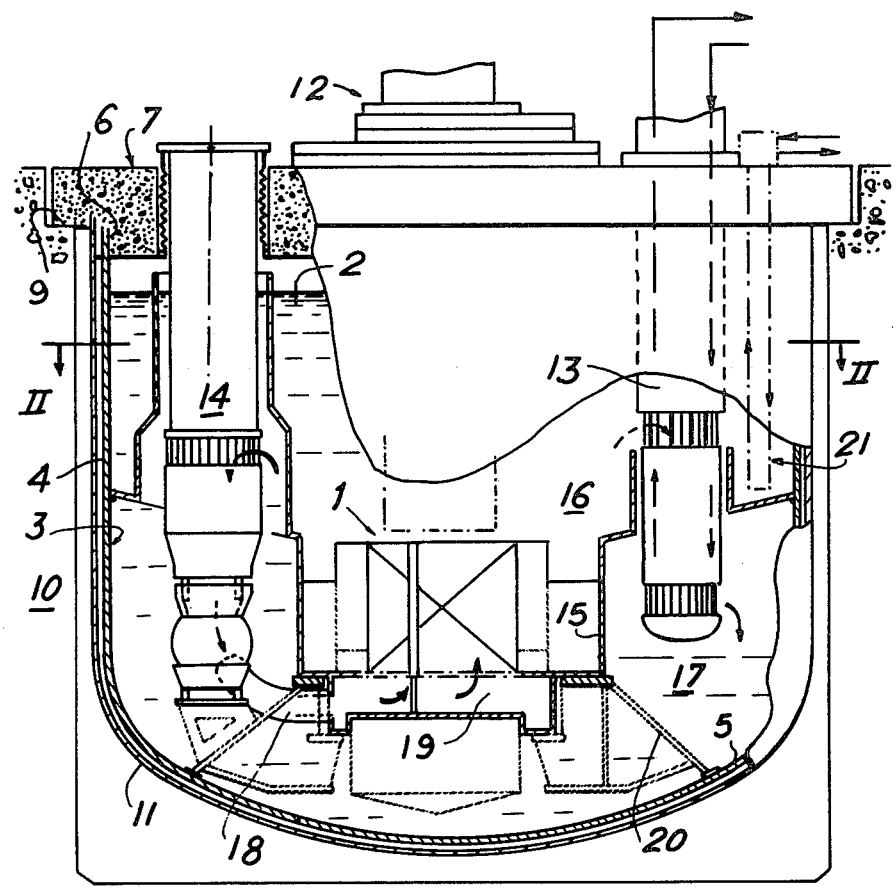
FIG. 1 is a schematic view partly in transverse section showing a fast reactor equipped with auxiliary heat exchangers in accordance with the invention.

There is shown diagrammatically in FIG. 1 a sectional view of a fast reactor having an integrated structure. The core 1 of the reactor is immersed in a volume 2 of a liquid metal coolant usually consisting of sodium and contained in a reactor vessel or so-called primary vessel 3 having a vertical axis. Said vessel comprises a lateral cylindrical shell 4 and a substantially hemispherical bottom end 5, the open-topped end 6 of the cylindrical shell being embedded in a thick concrete slab or reactor vault roof 7 which closes the reactor vessel above the level of sodium. Said vault roof is provided with a peripheral annular shoulder 9 which rests in leaktight manner on a corbel, said corbel being formed in the top edge of an outer containment vault 10 which delimits the installation. Within the containment vault 10, provision is made for a second vessel 11 or so-called safety vessel which surrounds the primary vessel 3.

In accordance with conventional practice, the reactor vault roof 7 is traversed by a series of components which are necessary for reactor operation. In particular, the vault roof carries a central system of rotating shield plugs 12 shown diagrammatically and located laterally with respect to this latter, intermediate main heat exchangers 13 and primary circulating pumps 14 disposed at uniform intervals around the reactor core so that two heat exchangers 13 correspond in this design to one circulating pump 14 as shown in the transverse fragmentary sectional view of FIG. 2.

The sodium 2 contained within the reactor vessel 3 is distributed within this latter in two zones on each side of an inner vessel 15 which delimits two collectors 16 and 17. The hot sodium discharged from the reactor core passes through the heat exchangers 13, is collected beneath the inner vessel 15, recirculated by the pumps 14 and returned through large-section ducts 18 into a box 19 which is provided beneath the reactor core 1 within a core support diagrid 20. During operation, the sodium is thus circulated continuously through the reactor core whilst the main heat exchangers 13 serve to extract the heat generated as a result of the fission reaction. This heat is then utilized in external generators (not shown in the drawings) in order to produce expanded steam in the turbines of an installation for the generation of electric power.

In accordance with the invention, a series of auxiliary heat exchangers 21 is also placed within the reactor vessel 3 beneath the vault roof 7. In the event of stoppage of the primary pumps 14, said auxiliary exchangers accordingly serve to carry out suitable cooling of the hot sodium discharged from the collector 16 and to circulate this latter, thus permitting removal of residual reactor power.

Figure 2:
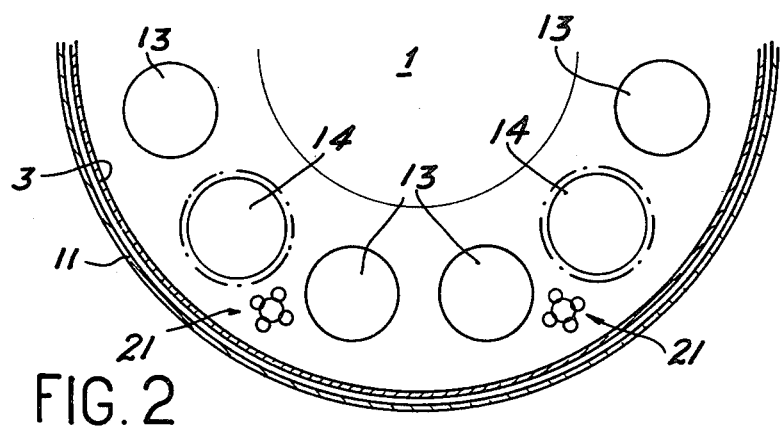
FIG. 2 is a schematic view partly in section taken along line II—II of FIG. 1.

FIG. 3 illustrates to a larger scale the constructional detail of one of the heat exchangers 21, these latter being mounted within the reactor vessel as illustrated in FIG. 2, especially in the immediate vicinity of the pumps and heat exchangers.

Each heat exchanger 21 is constituted by a plurality of modules 22 (four in number in the example considered), the auxiliary heat exchanger being placed within the reactor vessel opposite to a cylindrical passage 23 formed through the vault roof 7 and normally closed during operation by means of a shield plug 24 containing a series of steel plates 36. The passage 23 has a diametrical dimension which is appreciably smaller than that of the auxiliary heat exchanger 21. On the other hand, said diametrical dimension is larger than that of each individual module 22 in order to make it possible in accordance with an important feature of the invention to introduce each module into the reactor vessel one by one, the shield plug 24 being then fitted after the complete heat-exchanger assembly has been installed. The shield plug 24 has a lower extension 25 which penetrates into the reactor vessel and around which the modules 22 are disposed at intervals. In the example of construction under consideration, each module is made up of a tube coil 26, the ends of which are connected to two tubes 27 and 28 respectively for the admission and discharge of a coolant fluid which circulates within each tube coil. The tubes 27 and 28 extend within the passage 23 in a direction parallel to the axis of the shield plug 24 and are connected externally of the reactor and above the vault roof 7 to a pumping means 29 for circulating the coolant fluid. The coolant advantageously consists of liquid sodium.

In more precise terms, the module supply tubes 27 are connected to an annular inlet header (not shown in the drawings) whilst the outlet tubes 28 are connected to an annular manifold 29. The manifold 29 is associated with a pumping means 29′ which is preferably an electromagnetic pump.

In order to support the modules 22 after these latter have been introduced into the reactor vessel 3, each module is provided with a bottom bearing disc 30 having an extension in the form of an axial centering pin 31. Said pin is capable of engaging within a bore 32 formed in the axis of a support column 33 and this latter is in turn rigidly fixed to the inner vessel 15 which delimits the hot collector 16 and the cold collector 17. As an advantageous feature, said support columns 33 are rigidly fixed to a top plate 34 provided at the center of the heat exchanger with a vertical pin 35 which is adapted to engage in a passage 36 formed in the axis of the extension 25 which is provided axially beneath the shield plug 24.

Figure 4:
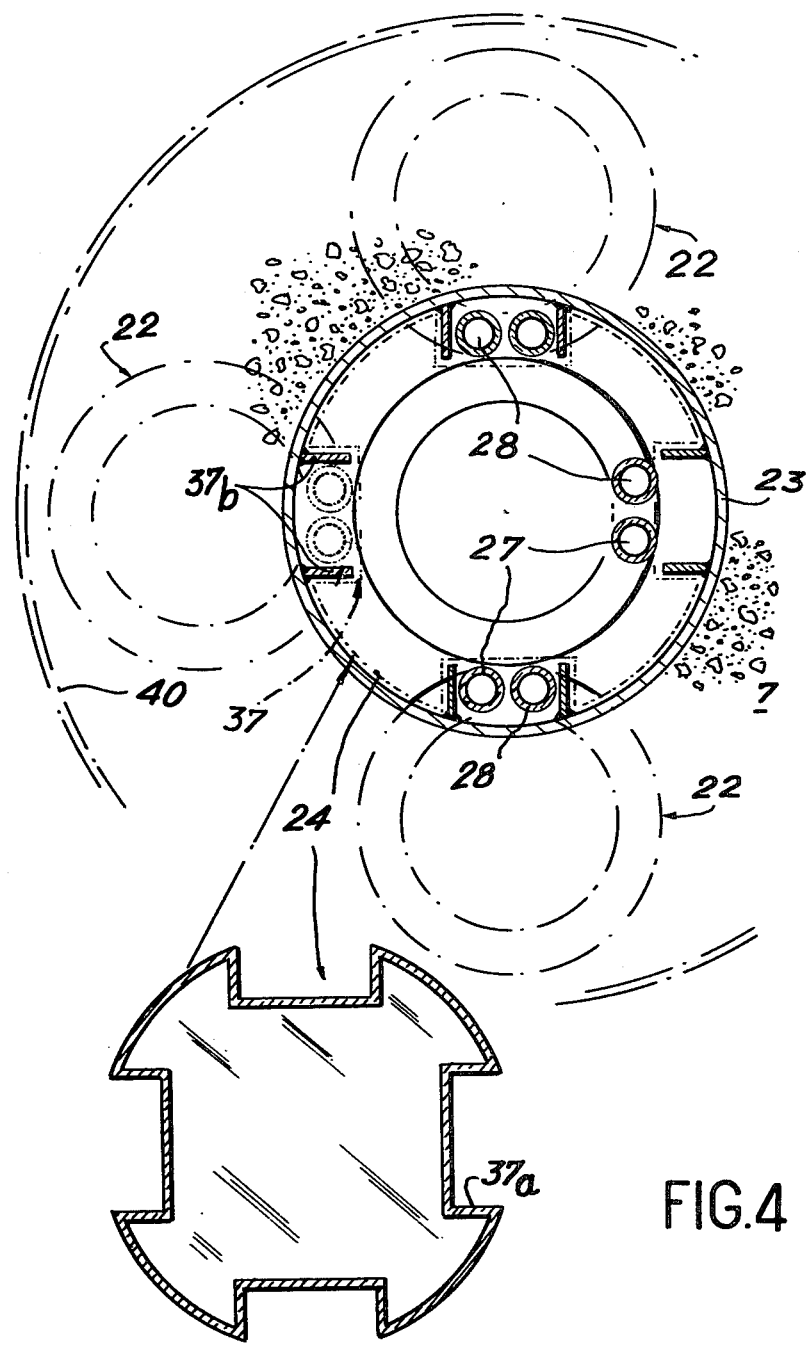

FIG. 4 illustrates to a larger scale in transverse section a few details of the modules 22 and of the shield plug 24 which seals-off the passage 23, thus making it possible in particular to gain a clearer understanding of the procedure adopted for positioning the modules within the reactor vessel. As shown in this figure, the shield plug 24 has been withdrawn from its passage 23 so as to permit the engagement of each module 22 one by one. Once it has been introduced into the passage 23 and displaced downwards until it penetrates into the reactor vessel 3, said module 22 is then displaced laterally so as to ensure that its tubes 27 and 28 engage within a recess 37 provided in the inner lateral surface of the passage 23 and delimited by two radial plates 37b. Said recess 37 is also delimited by a groove 37a formed in the shield plug 24 and having the same profile. In the exemplified embodiment which is illustrated, provision is thus made for four recesses 37–37a for mounting four modules 22 within the reactor vessel, said modules being disposed at intervals around the axis of the extension 25 after the shield plug 24 has been placed in position.

In order to carry out the same operation in reverse for the disassembly of one of the modules aforesaid in the event of accidental damage, a first step consists in removing a protective sealing cover 38 placed externally and above the reactor vault roof in order to gain access to the ends of the tubes 27 and 28, whereupon said ends are then cut. The next step consists in positioning a shielding hood 39 above the shield plug 24 and in withdrawing this latter. The defective module is then withdrawn through the passage 23 by disengaging its centering pin 31 from its bore 32. After a lateral movement of displacement which brings the module in the axis of the passage 23, said module is then moved upwards into the interior of the hood outside the reactor containment vault. The defective module can then be replaced by a fresh module, the operation in this case being performed exactly in the reverse order.

The foregoing arrangements result in an emergency heat exchanger for a nuclear reactor and especially a fast reactor, which is designed to provide a large heat-transfer surface while minimizing the diametrical dimension of the passage required for each constituent module. The arrangements according to the invention also permit of ready assembly and disassembly of each individual module.

It is important to note that the auxiliary heat exchangers 22 not only have an emergency function in the sense defined in the foregoing. In fact, the coolant circulates continuously within the fluid circuit, which therefore means that the residual power removal function can be performed at each instant. Furthermore, during normal reactor operation, the auxiliary heat exchangers have a contributory function in the removal of thermal power. Finally, they are also utilized during operations which involve handling of fuel assemblies within the reactor core. In fact, in this case the liquid sodium must be maintained at a temperature of the order of 180° C. The auxiliary exchangers play a part in maintaining this temperature.

Figure 6A:
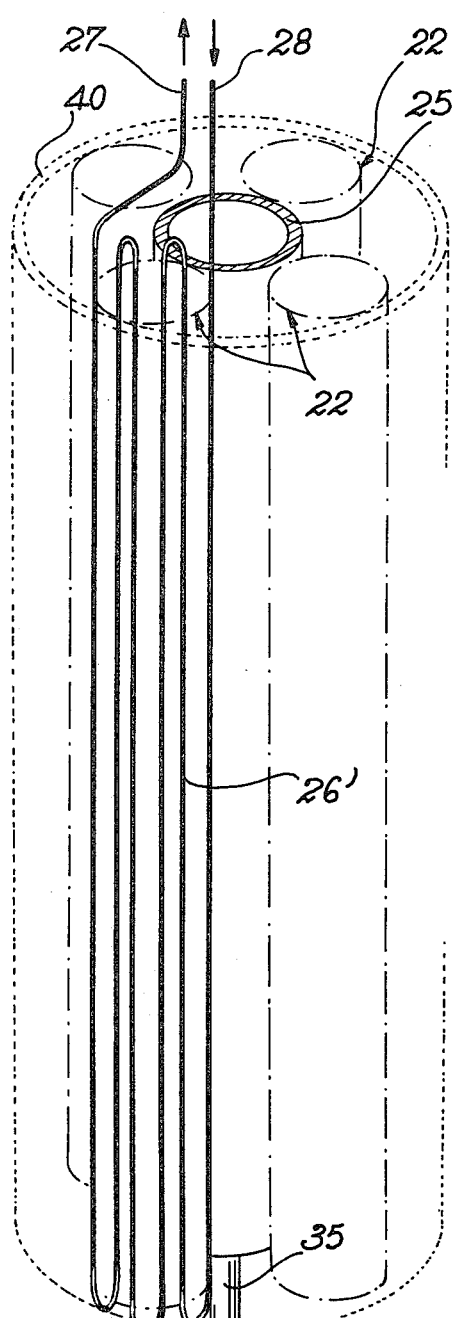
FIGS. 6a to 6c show alternative embodiments of the coolant fluid circuit.

As can readily be understood, the invention is not limited to the single example of construction which has been more especially described in the foregoing and illustrated in the accompanying drawings but extends on the contrary to all alternative forms. It would be possible in particular to provide a cylindrical shielding and guiding shell 40 (as shown in FIG. 3) around the assembly of modules 22. In this case, said cylindrical shell 40 is provided with openings 41 in order that the sodium within the reactor vessel 3 can be brought into contact with the tube coil 26. Said tube coil could also be replaced by a bundle of heat-transfer tubes of different shape. In accordance with FIG. 6a, the tube coils could be replaced by a tube designed in the form of a series of hairpin tubes. This figure shows a heat-transfer tube 26' which has the above-mentioned shape and the ends of which are connected to the inlet and outlet tubes 27 and 28, these two tubes being designed in the manner which has already been described with reference to FIG. 3.

Figure 6B:
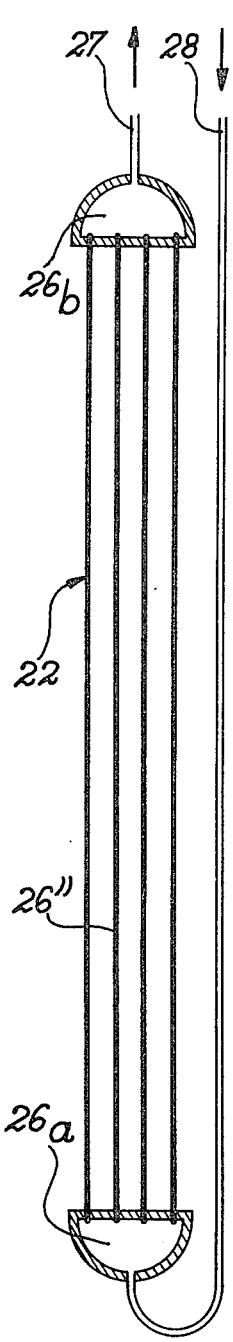

FIG. 6b shows another alternative embodiment of the heat-exchange bundle. This bundle is constituted by a suitable number of heat-transfer tubes 26" which are straight tubes fixed between an inlet header 26a and an outlet header 26b. The tubes 27 and 28 are connected to the headers 26a and 26b.

Figure 6C:
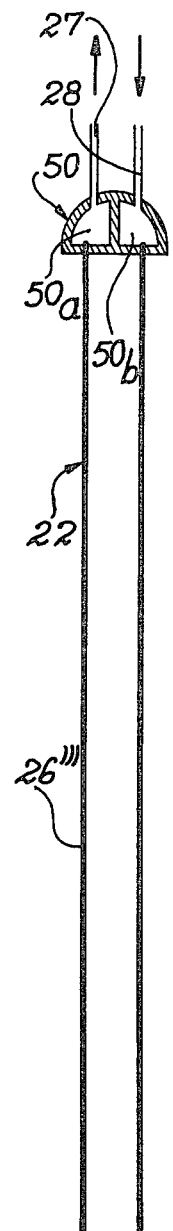

In the alternative embodiment of FIG. 6c, the heat-exchange bundle is constituted by U-tubes 26''' associated with a header 50 which, in accordance with a known technique, is divided into two half-headers 50a and 50b respectively for admission and discharge. These two half-headers are connected to the tubes 27 and 28.

It should be understood that any particular alternative embodiment of the heat-exchange bundle provides the same advantages as those which have already been mentioned.

We claim:

1. A fast neutron nuclear reactor comprising a vessel having a vertical axis and containing a reactor core, a volume of liquid metal for cooling the core, at least one main heat exchanger and at least one auxiliary heat exchanger, said reactor vessel being closed at the top by a reactor vault roof, said auxiliary heat exchanger being constituted by a plurality of vertical heat-exchanger modules, each of said modules comprising a circuit for the flow of coolant fluid, said reactor vault roof being pierced by a single orifice in vertical alignment with the vertical axis of said auxiliary heat exchanger, the dimension of said orifice in horizontal cross-section being larger than that of each one of said heat-exchanger modules but smaller than the overall dimension of the auxiliary heat exchanger in horizontal cross-section, and a removable shield plug closing said orifice, said shield plug having a depending axial extension penetrating into said reactor vessel with said modules disposed around said extension, the fluid circuit of each module communicating with an inlet tube and with an outlet tube for admission and discharge of the coolant fluid, said inlet and oulet tubes of each module extending in a direction parallel to the shield plug and the axial extension thereof within a respective recess formed in the inner surface of one of said orifice and said shield plug, whereby any of said modules of said auxiliary heat exchanger can be individually introduced into and taken out of said reactor in any order through said orifice after removal of said shield plug.

2. A nuclear reactor according to claim 1, wherein the fluid circuit of each module is constituted by a heat-transfer tube connected at the ends thereof respectively to said inlet tube and to said outlet tube for admission and discharge of the coolant fluid.

3. A nuclear reactor according to claim 2, wherein said heat-transfer tube has the shape of a tube coil.

4. A nuclear reactor according to claim 2, wherein said heat-transfer tube has the shape of a series of reversed hairpins.

5. A nuclear reactor according to claim 1, wherein the fluid circuit of each module is constituted by a plurality of U-tubes connected to an inlet header and an outlet header, said headers communicating respectively with said inlet tube and with said outlet tube for admission and discharge of the coolant fluid.

6. A nuclear reactor according to claim 1, wherein said fluid circuit of each heat-exchange module is constituted by a plurality of straight tubes connected at the ends thereof to an inlet header and to an outlet header, said header communicating respectively with said inlet tube and with said outlet tube for admission and discharge of the coolant fluid.

7. A nuclear reactor according to claim 2, wherein the inlet tubes of the modules are connected to an annular inlet manifold and the outlet tubes of the modules are connected to an annular discharge manifold communicating with means for pumping the coolant fluid, said annular manifolds being located externally of the reactor vessel and above the reactor vault roof and said pumping means being located externally of the reactor vessel.

8. A nuclear reactor according to claim 7, wherein the coolant fluid is liquid sodium and wherein the pumping means are constituted by an electromagnetic pump.

9. A nuclear reactor according to claim 1, wherein the modules constituting said auxiliary heat exchanger are surrounded externally by a cylindrical guide shell provided with open portions.

10. A nuclear reactor according to claim 1, wherein each heat-exchange module is provided at the lower end with a centering pin engaged in a bore provided in a support structure which is mounted within the reactor vessel and rigidly fixed thereto.

* * * * *